United States Patent [19]

Winbigler

[11] 4,371,154

[45] Feb. 1, 1983

[54] SPRING ASSEMBLY AND METHOD FOR MANUFACTURE THEREOF

[75] Inventor: Paul H. Winbigler, Coldwater, Mich.

[73] Assignee: Kuhlman Corporation, Troy, Mich.

[21] Appl. No.: 221,710

[22] Filed: Dec. 31, 1981

[51] Int. Cl.³ .................... F16F 1/12; B21F 35/00; B23P 13/00; B23P 11/00

[52] U.S. Cl. ..................... 267/179; 29/173; 29/512; 29/513; 29/523

[58] Field of Search ............... 29/512, 513, 173, 522, 29/523; 267/91, 179, 170

[56] References Cited

U.S. PATENT DOCUMENTS

| | | | |
|---|---|---|---|
| 446,203 | 2/1891 | Cochennour et al. | 267/179 X |
| 1,861,097 | 5/1932 | Simons | 29/513 UX |
| 2,020,348 | 11/1935 | Bebie | 29/513 UX |
| 2,379,804 | 7/1945 | Johson | 29/512 X |
| 3,122,829 | 3/1964 | Schaad et al. | 29/512 X |
| 3,361,251 | 1/1968 | Olsson | 29/512 X |
| 3,782,708 | 12/1971 | Dulude et al. | 267/179 X |
| 3,862,751 | 1/1975 | Schwaller | 267/179 X |

*Primary Examiner*—Charlie T. Moon
*Attorney, Agent, or Firm*—Harness, Dickey & Pierce

[57] ABSTRACT

An improved spring and expander cap assembly and method of attaching such expander caps to the opposite ends of a coil spring is disclosed wherein the expander cap is provided with a plurality of fingers which are deflected over the end coil of a helical coil spring. In a preferred embodiment substantially identical end caps are simultaneously secured to opposite ends of the spring.

10 Claims, 4 Drawing Figures

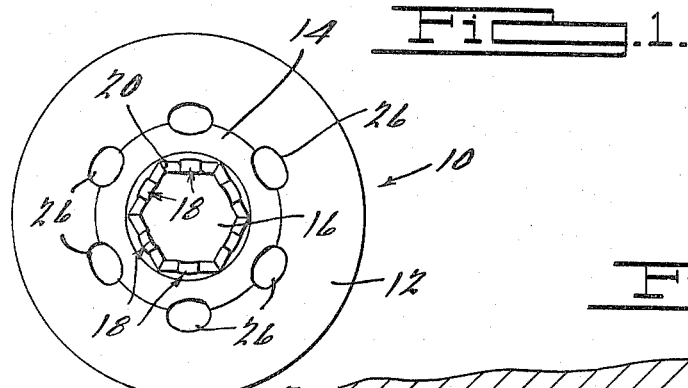
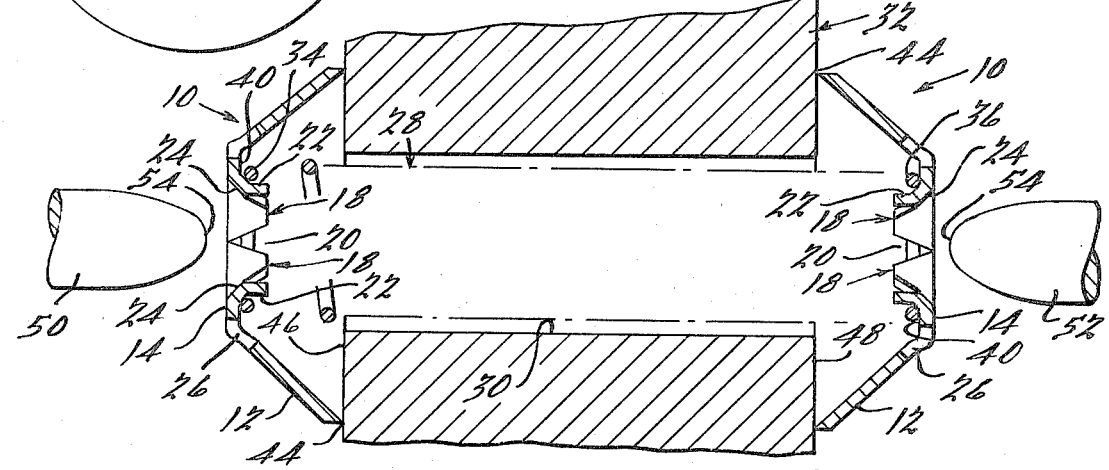
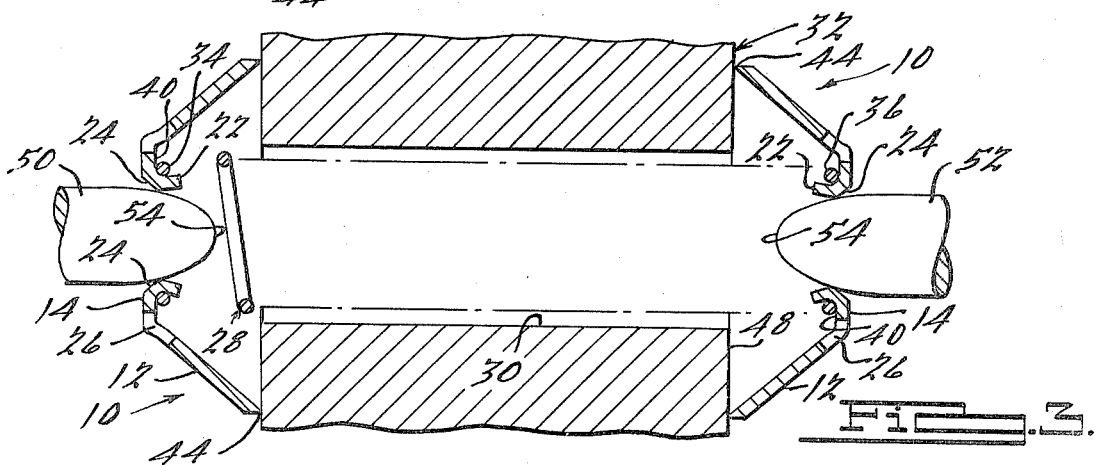
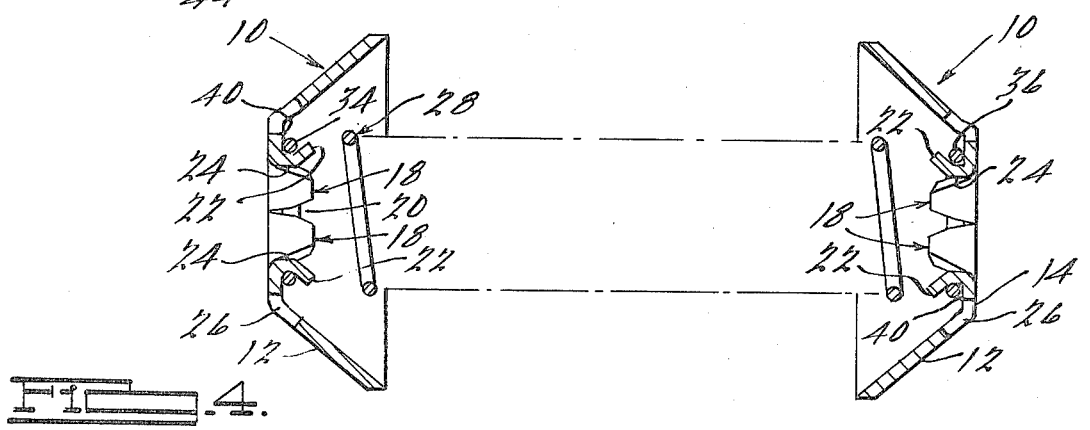

SPRING ASSEMBLY AND METHOD FOR MANUFACTURE THEREOF

BACKGROUND AND SUMMARY OF THE INVENTION

The present invention relates generally to an improved spring and expander cap assembly and more particularly to such assemblies which are adapted for use in wheel cylinders of vehicle brake systems and a method by which such expander caps may be securely fastened to the end coils of a helical coil spring.

Drum type hydraulic brake systems such as commonly provided on the rear wheel of present day motor vehicles generally include a hydraulically actuated wheel cylinder comprising a housing having one or more pistons movably disposed therein. In some such wheel cylinders, a generally cup-shaped seal is provided which is urged against the inwardly facing end surface of the piston by a suitable coil spring. Originally, expander caps were not required on these springs because the brake system was filled with brake fluid and bled to remove air therefrom in a relatively conventional manner and the spring alone was sufficient to maintain the seal in position within the wheel cylinder. However, it has now become a common practice to initially fill the brake hydraulic system by first drawing a vacuum thereon and then introducing the brake fluid. Because the presence of a vacuum within the wheel cylinder will tend to collapse the skirt portion of these seals, it has become necessary to provide means such as expander caps on the ends of the springs to maintain the seals in an expanded condition and thereby prevent leakage of air into the brake system during filling thereof.

In order to facilitate assembly of the wheel cylinders as well as to insure the springs will be properly positioned relative to the associated expander caps, it is desirable to securely attach the expander caps to the springs so as to form a subassembly therefrom. However, in so forming the subassembly, it is very important that the expander caps be securely attached to the spring ends so as to prevent loss of one or both of the end caps during shipping or handling thereof.

Heretofore, such end caps have been attached to the springs by providing a plurality of nubbins on the expander cap. However, this method has not proved totally satisfactory. In the nubbin form of attachment, a cylindrically shaped flange portion of the expander cap is provided with a number of relatively small generally radially outwardly extending protrusions or nubbins spaced around the periphery thereof and the spring is pressed onto the flange portion so as to cause the end coil to snap over the nubbins. In this attachment arrangement, the tolerances between the spring and the expander cap are critical to the security of the attachment and hence often expander caps may become separated from the spring. While it may be possible to improve the security of this attachment arrangement by requiring closer tolerances on the manufacture of both the spring and expander caps, this would result in significantly higher production costs and therefore is not a completely acceptable alternative.

Dulude, U.S. Pat. No. 3,782,708, discloses another means of attaching a spring to a stamped plate by staking which method does provide a secure connection therebetween.

However, this method requires a tool to move coaxially through the spring to form a generally cylindrical flange over the end coil of the spring and thus could not be utilized to attach expander caps to both ends of the spring. In double action wheels cylinders, two pistons and two seals are provided which are movable in opposite axial directions and thus expander caps must be provided on both ends of the spring to retain each of the seals in position.

The method of the present invention, however, overcomes these disadvantages by providing a means for securely attaching the expander caps to both of the opposite end coils of a spring which method does not require excessively tight tolerances for the manufacture of either of the parts but yet provides a very secure attachment therebetween. In accordance with the method of the present invention, the expander cap is provided with a plurality of fingers or tabs which are designed to extend into the interior of the spring. These tabs are initially provided with a shape so as to allow the spring to be easily fitted thereover after which a suitable tool operates to deflect the fingers over the outermost or end coil of the spring. Because the tool enters the spring from the end to which the expander cap is being attached rather than moving axially through the spring as in the aforementioned patent, the presence of any restrictions on the opposite end of the spring (such as for example the other expander cap) will not interfere with the practicing of the present method. Further, it is possible to simultaneously attach expander caps to both ends of the spring thereby allowing rapid relatively low cost assembly thereof.

Additional advantages and features of the present invention will become apparent from the subsequent description and the appended claims taken in conjunction with the accompanying drawings.

BRIEF DESCRIPTION OF THE DRAWINGS

FIG. 1 is an end view of an expander cap designed for use in practicing the method of the present invention;

FIG. 2 is a sectioned view of a pair of expander caps shown in position on a helical coil spring with a pair of punches about to deflect portions of the expander caps over the end coils of the spring, all in accordance with the present invention, the section being taken along a radial plane extending parallel to the axis of the spring;

FIG. 3 is a view similar to FIG. 2 but showing the punches advanced partially into the opening provided in the expander cap; and FIG. 4 is a view similar to that of FIGS. 2 and 3 showing the spring with a pair of expander caps securely fastened to opposite ends thereof.

DESCRIPTION OF THE PREFERRED EMBODIMENT

Referring now to the drawings and in particular to FIGS. 1 and 2, there is shown an expander cap 10 designed for use in practicing the method of the present invention. As shown therein, expander cap 10 has a generally hollow frusto conically shaped skirt portion 12 flaring radially and axially outwardly from a small relatively flat radially extending flange portion 14 surrounding a centrally disposed opening 16 provided therein. Opening 16 is defined by a plurality of substantially identical tab or finger portions 18 separated by slits 20 therebetween. Tabs 18 extend generally axially inwardly from flange portion 14 and are adapted to engage and grasp the end coil of a spring to which expander cap 10 is to be assembled.

As best seen with reference to FIG. 2, each of the tabs 18 includes an end portion 22 extending generally parallel to the axis of opening 16 and an intermediate portion 24 extending at an angle between end portion 22 and the radially extending flange portion 14. Preferably, intermediate portion 24 will be angled at approximately 40°–50° relative to the axis of opening 16 and thus will form an obtuse included angle with end portion 22. As shown, slits 20 extend outwardly to the flange portion surrounding the opening. A plurality of relatively small openings 26 are also provided in skirt portion 12 of expander cap 10 spaced radially outwardly from opening 16.

Expander cap 10 may be easily fabricated from any suitable metal such as for example steel and by any suitable forming operation such as a stamping process. Opening 16 may be easily formed along with tab portions 18 by merely cutting slits 20 in flange portion 14. In some cases, it may be desirable to form slots between tab portions 18 instead of merely slitting the flange portion.

Referring now to FIGS. 2 and 3, a spring 28 to which a pair of substantially identical expander caps 10 are to be secured is shown supported within an elongated bore 30 provided in suitable support means 32 such as for example a split die having a width slightly less than the axial length of spring 28. Expander caps are then positioned on the opposite outwardly extending end portions of spring 28 with the respective end coils 34 and 36 thereof being received within annular recesses 38 defined by inner surface 40 of skirt 12 and tabs 18. Preferably, end coils 34 and 36 of spring 28 will be of a slightly smaller diameter than the intermediate coils so as to avoid interference between tab portions 18 and the active intermediate coils. Preferably, support means 30 will have a width slightly greater than the axial length of spring 28 less twice the axial distance between flange portion 14 and inner edge 44 of skirt portion 12 and spring 28 will be centered therein so as to extend outwardly from opposite ends of bore 30 approximately equal distances. This will thus allow edge 44 of expander caps 10 to engage respective end surfaces 46 and 48 of support means 30 with end coils 34 and 36 fully seated within recesses 38 while spring 28 is only slightly compressed.

A pair of substantially identical assembly punches 50 and 52 each having a diameter slightly greater than the diameter of opening 16 and a generally arcuate leading end portion 54 are then advanced into opening 16 and into engagement with angled intermediate portions 24 of tabs 18. As the assembly punches are further advanced into opening 16, each of angled intermediate portions 24 will be deflected axially inwardly and radially outwardly thereby causing end portions 22 to move over or wrap around the respective end coils 34 and 36 of spring 28.

Once punches 50 and 52 have been advanced into opening sufficiently, angled intermediate portions 24 will have been deflected so as to now extend generally parallel to the axis of opening 16 and end portions 22 will have wrapped around the respective end coils 34 and 36 of spring 28 so as to securely attach expander caps 10 thereto thus completing the assembly operation. The split die may now be opened and the completed assembly removed therefrom and another assembly sequence begun.

It should be noted that while as shown expander cap 10 has been provided with six such tab portions 18 substantially equally spaced around the periphery of opening 16, the specific number required will depend upon several factors such as the thickness and relative stiffness of the metal used to fabricate expander cap 10, the diameter of opening 16 provided therein, etc. The greater the number of tabs 18, the less force will be required to deflect the tab portions into engagement with the spring end coils and hence the likelihood of expander cap 10 being distorted during assembly will be reduced. Additionally, in forming opening 16 in the expander cap and the associated tabs 18, it is desirable that the size of the opening be selected so as to substantially avoid any enlargement of the associated spring diameter and that the tabs 18 be of sufficient length relative to the diameter of the spring wire as to fold substantially fully over the respective end coils 34 and 36. Further, in some cases such as where the spring diameter is relatively large as compared to the wire diameter and pitch thereof, it may be necessary to trim the length of tabs 18 so as to avoid possible interference with the coil immediately adjacent end coils 34 and 36 of the spring 28 during assembly thereof. Thus while with relatively small diameter openings it may be possible to merely form the opening by cutting the slits in the expander cap, larger sizes may require a relatively small diameter opening be punched in the expander cap before or simultaneously with the slitting operation.

In any event, the method of the present invention provides a means for securely attaching expander caps to both ends of a coil spring very quickly and easily and at a relatively low cost.

While it will be apparent that the preferred embodiment of the invention disclosed is well calculated to provide the advantages and features above stated, it will be appreciated that the invention is suceptible to modification, variation and change without departing from the proper scope or fair meaning of the subjoined claims.

I claim:

1. A method of attaching an expander cap to a helical coil spring comprising:
    placing an expander cap on one end of a helical coil spring, said expander cap having a central opening defined by a plurality of tab portions spaced around the periphery thereof, said opening being positioned coaxially with the axis of said spring;
    moving punch means through said opening from the side of said expander cap opposite said spring into said one end of said spring so as to deform said tab portions over the end coil of said spring, said punch means having a diameter larger than said central opening.

2. A method of attaching an expander cap as set forth in claim 1 further comprising supporting said expander cap by means other than said spring as said punch is advanced through said opening.

3. A method of attaching an expander cap as set forth in claim 1 further comprising forming said central opening in said expander cap by forming a plurality of radially outwardly extending slits in a generally radially extending surface of said expander cap and deflecting said tabs axially inwardly thereof.

4. A method of attaching an expander cap as set forth in claim 3 further comprising positioning an end portion of each of said tabs relative to an intermediate portion of each of said tabs so as to define an obtuse included angle therebetween.

5. A method of attaching an expander cap as set forth in claim 4 wherein said end portion of each of said tabs is positioned in generally parallel relationship to the axis of said opening prior to assembly of said expander cap to said spring.

6. A method of attaching an expander cap as set forth in claim 4 wherein said intermediate portion of each of said tabs is deflected by said punch to a position generally parallel to the axis of said opening.

7. A method of attaching an expander cap as set forth in claim 1 wherein a second expander cap is placed on the other end of said spring and second punch means are moved through a central opening in said second expander cap into said other end of said spring so as to deform tab portions defining said central opening over the end coil on said other end of said spring so as to thereby secure said spring and said second expander cap in assembled relationship.

8. A method of attaching an expander cap as set forth in claim 7 wherein said punch means and said second punch means are moved simultaneously.

9. A method of fabricating a spring-expander cap assembly comprising:
   forming a pair of substantially identical generally frusto conically shaped hollow expander caps having a generally radially extending surface at one end thereof;
   providing a central opening in said one end of said cap by forming a plurality of generally radially outwardly extending slits in said radially extending surface so as to thereby form a plurality of tabs;
   deforming said tabs so as to position an end portion thereof relative to an intermediate portion so as to define an obtuse included angle therebetween;
   placing one of said pair of expander caps on each end of a spring with said opening positioned generally coaxially with the axis of said spring;
   moving first and second punch means into said openings in said end caps, said punch means being operative to deform said tab portions so as to position said end portions of said tabs in overlying relationship to end coils on opposite ends of said springs so as to thereby securely attach said expander caps to said spring.

10. A spring expander cap assembly comprising a helical coil spring having end coils provided on opposite ends thereof, a pair of expander caps, each of said expander caps including a hollow generally frusto conically shaped skirt portion and a central opening therethrough, said opening being defined by a plurality of axially inwardly extending tab portions having slits therebetween, one of said expander caps being secured to each of said end coils by deforming said tab portions through the action of punch means being moved through said opening so as to cause each of said tab portions to fold over respective of said end coils.

* * * * *

UNITED STATES PATENT AND TRADEMARK OFFICE
CERTIFICATE OF CORRECTION

PATENT NO. : 4,371,154
DATED : February 1, 1983
INVENTOR(S) : Paul H. Winbigler

It is certified that error appears in the above-identified patent and that said Letters Patent is hereby corrected as shown below:

ON THE TITLE PAGE,
Filing date, "December 31, 1981" should be --December 31, 1980--.

Reference 2,379,804, "Johson" should be --Johnson--.

Column 1, line 14, "wheel" should be --wheels--.

Column 2, line 3, "wheels" should be --wheel--.

Column 4, line 35, "suceptible" should be --susceptible--.

Signed and Sealed this

Twenty-first Day of June 1983

[SEAL]

Attest:

DONALD J. QUIGG

Attesting Officer

Acting Commissioner of Patents and Trademarks